United States Patent
Suk et al.

(10) Patent No.: US 6,635,685 B2
(45) Date of Patent: *Oct. 21, 2003

(54) RIGID POLYURETHANE FOAM AND PROCESS FOR PRODUCING THE SAME

(75) Inventors: Sang Jo Suk, Kwangju (KR); Bong Ku Kim, Kwangju (KR); Sang Bu Jeon, Kwangju (KR); Cheol Min Hur, Kwangju (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/022,247

(22) Filed: Dec. 20, 2001

(65) Prior Publication Data

US 2002/0103269 A1 Aug. 1, 2002

Related U.S. Application Data

(62) Division of application No. 09/636,757, filed on Aug. 14, 2000, now Pat. No. 6,384,098.

(30) Foreign Application Priority Data

Feb. 9, 2000 (KR) .......................................... 2000-5921

(51) Int. Cl.$^7$ ................................................ C08G 18/32
(52) U.S. Cl. ........................ 521/131; 521/130; 521/167; 521/172; 521/173; 521/174
(58) Field of Search ................................ 521/130, 172, 521/174, 167, 131, 173

(56) References Cited

U.S. PATENT DOCUMENTS 5,444,101 A * 8/1995 De Vos et al. ............... 521/131
5,648,019 A * 7/1997 White et al. ........... 252/182.24

* cited by examiner

Primary Examiner—John M. Cooney, Jr.
(74) Attorney, Agent, or Firm—Larson & Taylor PLC

(57) ABSTRACT

A process for producing a rigid polyurethane foam provides a rigid polyurethane foam having a closed-cell size of about 80–130 μm and thus, improved heat insulating properties.

6 Claims, No Drawings

RIGID POLYURETHANE FOAM AND PROCESS FOR PRODUCING THE SAME

The present application is a divisional of U.S. patent application Ser. No. 09/636,757, filed Aug. 14, 2000 which is now U.S. Pat. No. 6,384,098.

FIELD OF THE INVENTION

The present invention is related to production of rigid polyurethane foam, and more particularly, to a process for producing rigid polyurethane foam having improved heat insulating properties from a polyaromatic polyol, and to the rigid polyurethane foam produced thereby.

BACKGROUND OF THE INVENTION

Rigid polyurethane foams are usually obtained by reacting a polyol component and an isocyanate component in the presence of a blowing agent, a reaction catalyst and a foam stabilizer. To obtain polyurethane foam which is excellent in heat insulating properties, CFCs (chlorofluorocarbons), such as trichloromonofluoromethane or dichlorofluoromethane, are conventionally used as a blowing agent. However, CFCs are not readily decomposable and, when released into the atmosphere, they destroy the ozone layer in the stratosphere or cause rise of earth surface temperature due to the so-called greenhouse effect. Thus, their uses have posed a global environmental pollution problem. The production and consumption of CFCs are expected to be restricted in the near future and several approaches are being taken to reduce their uses. One example is to use substituents for CFCs. As promising substituents, there have been proposed HCFCs (hydrochlorofluorocarbons). HCFCs have been used, for example, as a blowing agent for the production of rigid polyurethane foams. The resultant polyurethane foams have a closed cell size of 200–300 $\mu$m, but still show excellent heat insulating properties.

However, since HCFCs also may destroy the ozone layer to a certain degree, their use is being gradually reduced. Instead, hydrocarbon blowing agents such as cyclopentane are now used in the preparation of rigid polyurethane foams.

However, since the rigid polyurethane foam produced with cyclopentane as a blowing agent has a closed cell size of 200–300 $\mu$m and the adiabatic index of cyclopentane is 0.0121 mW/mk, which is higher than that of CFC or HCFC, the heat insulating property of the rigid polyurethane foam is not satisfactory. Thus, a larger volume of rigid polyurethane foam is needed for the same heat-insulation.

The present invention is thus directed to a rigid polyurethane foam having an excellent heat-insulating property, cyclopentane being used as a blowing agent in production of the rigid polyurethane foam. The inventors have discovered that the rigid polyurethane foam produced by reacting a polyol having a special composition with a polyisocyanate in the presence of cyclopentane as a blowing agent shows excellent heat-insulating properties. Further, the inventors have also found that the same result can be obtained when HFCs (hydrofluorocarbons) are employed as a blowing agent.

SUMMARY OF THE INVENTION

Thus, the present invention provides a rigid polyurethane foam which has excellent heat insulating properties.

The invention also provides a process for producing such a rigid polyurethane foam.

The process according to the invention comprises reacting a polyol component and a polyisocyanate component in a reaction medium containing a blowing agent, said blowing agent being cyclopentane or HFCs, and said polyol component being at least one polyaromatic polyol selected from the group consisting of toluenediamine-based polyols, methylenediphenyldiamine-based polyols and bisphenol-A-based polyols, and having an average OH value of 200–650.

These and other features of the present invention will be apparent to one of ordinary skill in the art from the following detailed description.

DETAILED DESCRIPTION OF THE INVENTION

The present invention will be described in more detail hereinafter.

Generally, the heat insulating property is represented by the following Equation (1):

$$\lambda \text{total} = \lambda \text{gas} + \lambda \text{solid} + \lambda \text{radiation}$$

In Equation (1), $\lambda$gas is the adiabatic index of the blowing agent existing in the closed cell of rigid polyurethane foam and occupies 74% of the total adiabatic index ($\lambda$total). Further, it is affected by the composition of the blowing agent. Thus, with increasing amounts of blowing agent having a low adiabatic index, a more improved heat insulating property is obtainable. $\lambda$solid is the adiabatic index of the urethane resin comprising the rigid polyurethane foam and occupies 10% of $\lambda$total. It may be affected by the density of the rigid polyurethane foam. But most of the rigid polyurethane foam is hardly affected by it. Generally, the rigid polyurethane foam shows the most excellent heat insulating property when its density is 30–40 kg/m$^3$. $\lambda$radiation is the adiabatic index when the radiation is between the closed cells of rigid polyurethane foam and occupies 16% of $\lambda$total. Further, it is affected by the closed cell size of the rigid polyurethane foam and is proportional to the closed cell size.

Accordingly, if cyclopentane having a high adiabatic index is used as a blowing agent, the $\lambda$radiation of Equation (1) should be increased to improve the heat insulating property.

The present invention provides an improved heat insulating property by controlling the value of $\lambda$radiation. As a result, if a polyether polyol essentially comprising a polyaromatic polyol is used for the production of rigid polyurethane foam, the resulting rigid polyurethane foam has a closed cell size of 80–130 $\mu$m and shows an excellent heat insulating property.

In the present invention, the polyaromatic polyol may include, but is not limited to, a polyol selected from the group consisting of toluenediamine-based polyols, methylenediphenyldiamine-based polyols and bisphenol-A-based polyols and has an average OH value of 200–650. The polyols may be used alone or in combination.

The toluenediamine-based polyols may generally be prepared by polymerizing alkylene oxides with 2,3- or 2,4-toluenediamine. Thus prepared polyols may have an average OH value of 300–450. Any suitable alkylene oxides such as ethylene oxide, propylene oxide and mixtures of these oxides may be used.

The methylenediphenyldiamine-based polyols may be prepared by polymerizing propylene oxide with methylenediphenyldiamine. Thus prepared polyols may have an average OH value of 300–650.

The bisphenol-A-based polyols may be prepared by polymerizing alkylene oxide with bisphenol-A in the same manner as that of toluenediamine-based polyols. Thus prepared polyols may have an average OH value of 200–500.

For the process according to the present invention, if one of the polyaromatic polyols is used alone, it is used in an amount of 5–70 parts by weight per 100 parts by weight of total polyols. Preferably, 50 parts by weight or more of toluenediamine-based polyols, 5–40 parts by weight of methylenediphenyldiamine-based polyols, and 5–20 parts by weight of bisphenol-A-based polyols may be used, respectively. The heat insulating performance of the solids in the cells of the rigid polyurethane foam is improved by using a large amount of aromatic components and thus, the thermal conductivity index may be lowered. However, if the amount of aromatic components is excessive, the adhesive force becomes weak and the rigid polyurethane foam breaks.

If two or more polyaromatic polyols are used in combination, the amount of mixture is preferably 40–70 parts by weight per 100 parts by weight of total polyols.

In addition, if polyaromatic polyol comprises, when used alone, 40 parts by weight or less per 100 parts by weight of the total polyols, preferably 40 parts by weight or less of the toluenediamine-based polyols, 5–10 parts by weight of the methylenediphenyldiamine-based poylols and 5–10 parts by weight of bisphenol-A-based polyols, or if polyaromatic polyol comprises, when it is used in combination, 40 parts by weight or less, polyaromaticester polyols and polyaliphaticester polyols may be further used in an amount of 5–20 parts by weight, respectively. Thus, the closed cell size of polyurethane foam may become 80–130 μm. However, if the amount of the polyester polyol is excessive, the closed cell size becomes small, but the strength of the rigid polyurethane foam becomes weak since the crosslinked degree is low. Further, since the polyester polyols is not compatible with the cyclopentane, the cyclopentane is separated from the polyols.

In the process according to the present invention, a reaction medium comprises a blowing agent, water, a reaction catalyst and a foam stabilizer, which are conventionally used in production of rigid polyurethane foam.

For the process according to the present invention, if water is used in an amount of 0.5 parts by weight or less, the density of the rigid polyurethane foam becomes high. Therefore, when the rigid polyurethane foam is used as a heat insulating material or a heat insulating structure for refrigerators, freezers, etc., the amount of foam introduced is increased. Further, if cyclopentane is used excessively as a blowing agent for lowering the density, the heat insulating property decreases due to the roughness of the closed cell. If water is used in an amount of 2 parts by weight or more, the heat insulating property is not improved since the amount of carbon dioxide gas exiting the closed cell is large. Therefore, in the present invention, water is preferably used in the amount of 0.5–2.0 parts by weight per 100 parts by weight of total polyols and, more preferably, used in the amount of 1.0–1.8 parts by weight per 100 parts by weight of total polyols.

For the process according to the present invention, cyclopentane or HFCs may be used as a blowing agent. Preferably, the amount of cyclopentane or HFCs is 12–25 parts by weight per 100 parts by weight of total polyols and, more preferably, 15–17 parts by weight of cyclopentane and 15–20 parts by weight of HFCs. In the above range, the adiabatic index becomes low by properly adjusting the mixing ratio of carbon dioxide gas and blowing agent existing in the closed cell. But, for this case, the compression strength should be controlled at 1.40 kg/cm$^2$ or greater.

The rigid polyurethane foam produced according to the present invention may be used as a heat insulating material for refrigerators. As a result, the power consumption may be reduced up to 5–10%.

The present invention will be described in more detail by way of various Examples, which should not be considered as limiting the scope of the invention.

To obtain the results of the following Table 1, test specimens of the rigid polyurethane foam were produced with a vertical mold (1100 mm×300 mm×50 mm) and a high pressure foam generator. The amount of all components used was on the basis of 100 parts by weight of the total polyols. The temperature of all components before foaming was adjusted to 20° C.

TABLE 1

|  |  | Examples |  |  |  | Comparative Examples |  |  |  |  |  |
|---|---|---|---|---|---|---|---|---|---|---|---|
|  |  | 1 | 2 | 3 | 4 | 1 | 2 | 3 | 4 | 5 | 6 |
| Polyol | TDA[1] | 50.0 | 35.0 | 50.0 | 40.0 | 25.0 | 45.0 | — | — | 30.0 | 75.0 |
|  | MDA[2] | 5.0 | — | — | 5.0 | — | — | 40.0 | — | 5.0 | 5.0 |
|  | Bisphenol-A[3] | 5.0 | — | — | 5.0 | — | — | — | 20.0 | — | — |
| Ester | Aliphatic[4] | — | — | — | — | — | — | — | — | 25.0 | — |
|  | Aromatic[5] | — | 15.0 | — | — | — | — | — | — | — | 20.0 |
| Ether | Glycerin based[6] | — | — | 10.0 | 20.0 | 15.0 | 15.0 | 20.0 | 20.0 | 10.0 | — |
|  | Glycerin/Sucrose based[7] | 40.0 | 20.0 | 40.0 | — | 40.0 | 20.0 | 20.0 | 20.0 | — | — |
|  | Sorbitol based[8] | — | 30.0 | — | 30.0 | 30.0 | 20.0 | 20.0 | 30.0 | 30.0 | — |
| Catalyst | PMDETA[9] | 0.2 | 0.1 | 1.1 | 0.3 | 1.1 | 0.3 | 0.3 | 0.3 | 0.1 | — |
|  | DMCHA[10] | 0.5 | 0.6 | 0.5 | 0.6 | 0.5 | 0.6 | 1.0 | 0.6 | 0.3 | 0.3 |
|  | PC-41[11] | 0.6 | 1.7 | 0.7 | 0.7 | 0.7 | 0.7 | 0.6 | 0.7 | 0.5 | 0.5 |
| Foam stabilizer[12] |  | 2.5 | 2.5 | 2.5 | 2.5 | 2.0 | 2.5 | 2.5 | 2.5 | 2.5 | 2.5 |
| Water |  | 1.5 | 1.6 | 1.65 | 1.5 | 2.2 | 1.8 | 1.8 | 1.8 | 1.8 | 0.4 |
| Cyclopentane |  | 17.0 | 15.5 | 16.5 | 16.5 | 14.5 | 16.0 | 16.0 | 16.0 | 16.0 | 19.0 |
| Mix Ratio (polyol/isocyanate)[13] |  | 100/114 | 100/114 | 100/114 | 100/115 | 100/123 | 100/112 | 100/112 | 100/112 | 100/115 | 100/104 |
| Ratio of the amount introduced for foam (%) |  | 101 | 102 | 102 | 102 | 100 | 101 | 101 | 101 | 100 | 106 |
| Cell size (μm) |  | 80–100 | 80–100 | 80–100 | 100–130 | 200–300 | 130–150 | 130–150 | 130–150 | 100–130 | 80–100 |
| K-factor[14] |  | 0.0 | 0.0 | 0.0 | 0.01 | 0.0 | 0.0 | 0.0 | 0.0 | 0.0 | 0.0 |

TABLE 1-continued

|  | Examples | | | | Comparative Examples | | | | | |
| --- | --- | --- | --- | --- | --- | --- | --- | --- | --- | --- |
|  | 1 | 2 | 3 | 4 | 1 | 2 | 3 | 4 | 5 | 6 |
| Compression strength | 150 | 150 | 150 | 55 | 165 | 158 | 158 | 158 | 155 | 150 |
| Volume Low temperature[15] | 1.45 | 1.42 | 1.45 | 1.45 | 1.45 | 1.44 | 1.43 | 1.38 | 1.38 | 1.40 |
|  | −1.0 | −1.1 | −1.0 | −1.0 | −1.0 | −1.0 | −1.0 | −1.2 | −1.3 | −1.2 |
| change High temperature[16] rate (%) | 7.0 | 7.1 | 7.0 | 7.0 | 7.0 | 7.0 | 7.1 | 7.6 | 8.0 | 7.8 |

[1]Toluenediamine-based polyol (OH value: 300–450)
[2]Methylenediphenyldiamine-based polyol (OH value: 300–650)
[3]Bisphenol-A-based polyol (OH value: 200–500)
[4]Polyaliphaticester polyol (OH value: 200–500)
[5]Polyaromaticester polyol (OH value: 200–500)
[6]Glycerine-based polyol (OH value: 100–700)
[7]Glycerine/sucrose-based polyol (OH value: 300–500)
[8]Sorbitol-based polyol (OH value: 400–500)
[9]Pentamethyldienyltriamine
[10]Dimethylcyclohexylamine
[11]Tris(dimethylaminopropyl)hydrotriazine
[12]Silicone-based surfactant
[13]Mix ratio (All components were mixed with polyol except polyisocyanate set the basis at 100)
[14]kcal/m.h. ° C. (adiabatic index unit)
[15]Test condition: −30° C., the test was carried out for 24 hours (the volume change rate was measured)
[16]Test condition: 70° C., relative humidity of 95%, the test as carried out for 24 hours (the volume change rate was measured)

As shown in Table 1, when the polyaromatic polyols of Examples 1 and 4, the polyols containing aromatic component, are used excessively, the closed cell size of the foam reaches 80–130 μm and thus, the adiabatic index is improved remarkably. However, the foam of Comparative Example 1 prepared with cyclopentane in a conventional method, has a closed cell size of 200–300 μm and, thus, the heat insulating property is low since the adiabatic index value is 0.0165 kcal/m.h.° C. Further, the foams of Comparative Examples 2–4 do not have a high enough degree of heat insulating properties, though the adiabatic index is improved since the polyol is used in 45, 40, 20 parts by weight, respectively. Further, since the foam of Comparative Example 4 has bivalent functional index, the crosslinked degree becomes low and thus, the foam exerts a bad influence upon the compression strength and dimensional change in high temperature and high humidity.

Further, though the adiabatic index is decreased by using 40 parts by weight or less of the polyaromatic polyol mixture and 25 parts by weight of polyaliphaticester polyol in Comparative Example 5, the functional index of the rigid polyurethane foam decreases and, thus, the strength and the volume change rate gets worse by excessive polyaliphaticester polyol. Since the polyaliphaticester polyol is not compatible with cyclopentane, the separation of cyclopentane and polyol occurs and, thus, the cyclopentane layer is formed.

In Comparative Example 6, since the polyaromatic polyol is used in the amount of 80 parts by weight, the closed cell size becomes 80–100 μm and thus, the heat insulating property is improved remarkably. However, the cell strength weakens and, thus, the volume change rate becomes worse. Since the amount of water used is small, the amount introduced for foam increases.

As described above, according to the present invention, the rigid polyurethane foam is produced by reacting a polyaromatic polyol with a polyisocyanate component in the presence of cyclopentane and, thus, the closed cell size of the rigid polyurethane foam becomes 80–130 μm and, as a result, the heat insulating property is improved. Therefore, if the rigid polyurethane foam produced according to the present invention is used as a heat insulating material for refrigerators, the power consumption may be reduced up to 5–10%.

Although preferred embodiments of the present invention have been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A process for producing a rigid polyurethane foam comprising:

reacting a polyol component with a polyisocyanate component in a reaction medium containing a blowing agent, said polyol component comprising a polyether polyol, said polyether polyol comprising at least two polyols selected from the group consisting of toluenediamine-based polyols, methylenediphenyldiamine-based polyols and bisphenol-A-based polyols and having an average OH value of 200–650, in an amount of 40–70 parts by weight of 100 parts by weight of total polyols, and said blowing agent comprising a component selected from the group consisting of cyclopentane and hydrofluorocarbons.

2. The process according to claim 1, wherein said polyol component further comprises a polyester polyol in an amount of 5–20 parts by weight, and said polyether polyol is in an amount of 40 parts by weight or less per 100 parts by weight of total polyols.

3. The process according to claim 1, wherein said blowing agent comprises 12–25 parts by weight per 100 parts by weight of total polyols.

4. The process according to claim 1, wherein said reaction medium further comprises a reaction catalyst, a foam stabilizer and water.

5. The process according to claim 4, wherein said water is used in an amount of 0.5–2.0 parts by weight per 100 parts by weight of total polyols.

6. A process for producing a rigid polyurethane foam comprising:

reacting a polyol component with a polyisocynate component in a reaction medium containing a blowing agent, said polyol component comprising toluendiamine-based polyols and methylenediphenyldiamine-based polyol and having an average OH value of 200–650, in an amount of 40–70 parts by weight of 100 parts by weight of total polyols, and said blowing agent being cyclopentane or HFCS.